| United States Patent [19] | [11] | 4,069,021 |
|---|---|---|
| Schneider | [45] | Jan. 17, 1978 |

[54] OXYGEN GENERATOR

[75] Inventor: Warren J. Schneider, Fort Lauderdale, Fla.

[73] Assignee: Green Cross Solid State Oxygen, Inc., Dania, Fla.

[21] Appl. No.: 759,844

[22] Filed: Jan. 17, 1977

[51] Int. Cl.² .............................................. B01J 7/00
[52] U.S. Cl. ...................................... 23/281; 102/39
[58] Field of Search ....................... 23/281; 102/39 R

[56] References Cited

U.S. PATENT DOCUMENTS 3,861,880  1/1975  Thompson .......................... 102/39 R

*Primary Examiner*—Stephen J. Lechert, Jr.
*Attorney, Agent, or Firm*—Malin & Haley

[57] ABSTRACT

In an oxygen generating system including a container, an ignition device sealed to the oxygen candle canister in the container, the ignition device ignites the oxygen producing candle to produce oxygen. The candle is encased and sealed in the canister having an exit with a breakable exit seal connected over the seal. The ignition device includes a manifold with an inlet and outlet, a glass capsule filled with water connected to and within the manifold above the exit seal, and an ignition mechanism including a plunger rod movably connected to the manifold. The plunger rod has a distal end positioned to break the capsule, to pierce the exit seal, and to transfer the water onto the oxygen candle in order to ignite the candle.

3 Claims, 4 Drawing Figures

U.S. Patent  Jan. 17, 1978  4,069,021
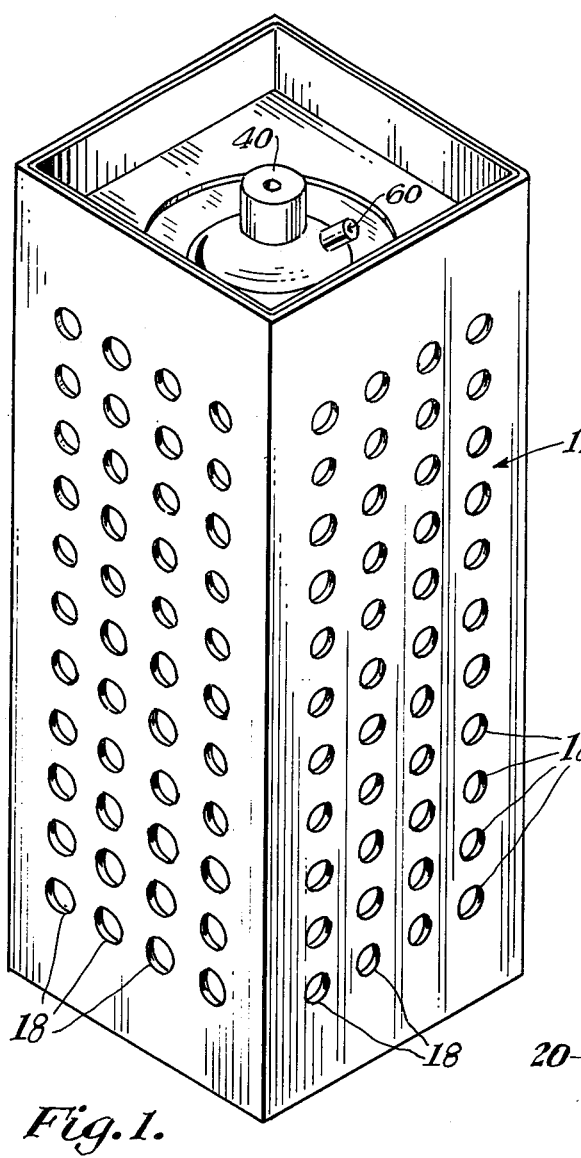
Fig.1.
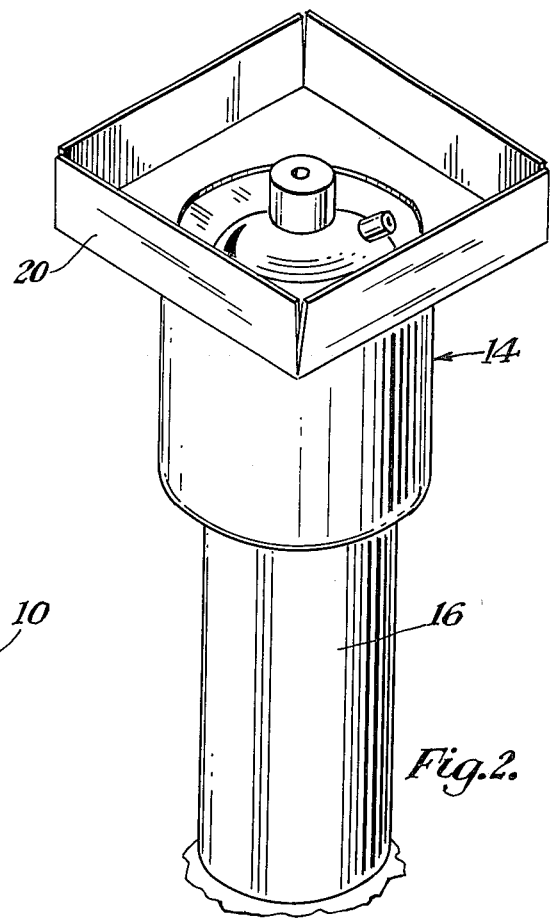
Fig.2.
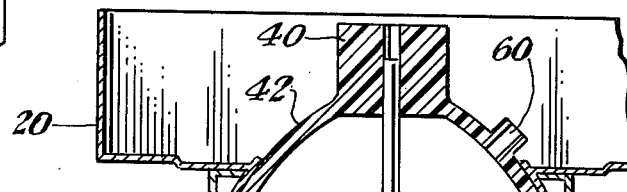
Fig.3.
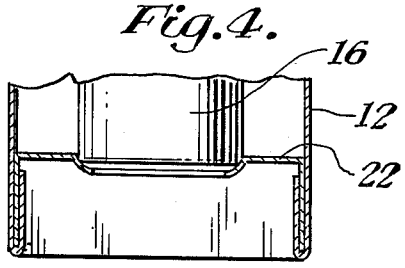
Fig.4.
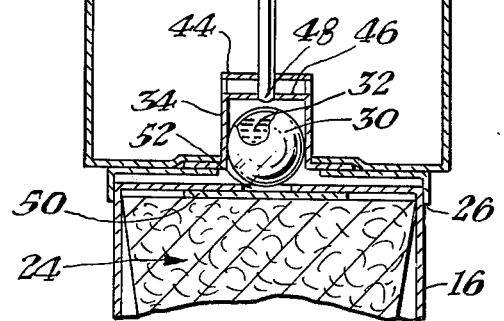

OXYGEN GENERATOR

BACKGROUND OF THE INVENTION

In the past ignition cones in oxygen candles have included alkaline metal, alkaline earth metal iodide or oxyiodide in combination with a principal oxidizer. The principal oxidizer consists of an alkaline metal monooxide and usually, an auxiliary oxidizer. The auxiliary oxidizer consists of one or more alkaline metal and alkaline earth metal peroxides and chlorates, which term includes the chlorates and perchlorates. This composition is included as a top layer in compressing a chemical oxygen generator composition to be ignited by an ignition cone means. In the past, water filled fracturable vials have been associated and connected in the top layer so that upon fracture, the water causes initiation of the ignition cone composition. Usually this is best performed through the use of an uncompacted or loose powder first fire composition of similar content as said ignition cone composition. Such means are described in U.S. Pat. No. 3,725,156.

Other ignition devices have been used, such as a cap carrying a striking pin that explodes a percussion cap in the lid of the canister to ignite the oxygen candle generator.

SUMMARY OF THE INVENTION

An ignition device for an oxygen generating candle. The ignition device is connectable to an oxygen canister that contains a candle in order to ignite the candle to produce oxygen. The ignition device includes a manifold, a glass capsule filled with water connected totally within the manifold, and an ignition mechanism. The ignition mechanism includes a plunger rod movably positioned in the manifold for actuation by a user. The rod moves toward the glass capsule in order to crush the capsule as the distal end of the plunger rod moves through the glass capsule. The glass capsule is positioned in a container compartment in the manifold. The distal end of the plunger rod is movable out past the lower surface of the manifold and the container compartment. The length of the steel plunger allows the distal end of the plunger to move out beyond the base of the manifold through the canister's sealed exit and into contact with the oxygen candle material. The plunger is used to break metal membrane or seal over the oxygen candle canister exit.

The oxygen candle canister seals the candle materials within the canister and normally includes an upper cover portion that is connected over the upper end of the oxygen candle body. The cover portion has an opening or exit therein. The seal or metal membrane seals the exit. The lower portion of the main manifold is sealed to the upper cover portion by a silicone sealing means. The silicone sealing means is positioned between the mating upper cover portion of the oxygen candle canister and the lower base portion of the main manifold. The silicone sealing means controls the flow of the oxygen produced by the candle as it moves toward the manifold exit port. The manifold has an upper oxygen exit port and a resilient plunger seal connected to the upper end or proximal end of the plunger rod.

The oxygen generator includes fins to disperse heat and an outer cover. The fins are connected between the canister, manifold and the cover.

It is an object of this invention to provide an ignition device having the non-explosive material connected to and positioned in the ignition device.

It is another object of this invention to provide a canister ignited by an outside liquid with a breakable sealed exit.

It is another object of this invention to provide an oxygen producing device with an improved ignition device that is easily manufactured.

It is another object of this invention to provide a reliable inexpensive oxygen producing device with an improved ignition device.

Another object of this invention is to provide an oxygen generator container that may be handled when the candle is burning.

In accordance with these and other objects which will be apparent hereinafter, the instant invention will now be described with particular reference to the accompanying drawings.

BRIEF DESCRIPTION OF THE DRAWING

In the drawing:

FIG. 1 is an isometric view of the oxygen generator.

FIG. 2 is an isometric view of FIG. 1 with the outer cover and lower fin removed.

FIG. 3 is a cross sectional side view of an upper portion of FIG. 2.

FIG. 4 is a cross sectional side view of a lower portion of FIG. 2.

DETAIL DESCRIPTION OF THE INVENTION

Referring now to FIGS. 1 and 2 showing the oxygen producing device generally designated by numeral 10, the device includes an outer container which is generally designated as numeral 12, an ignition device 14 and an oxygen canister 16. The outer container 12 is a cardboard container 3 having a plurality of openings 18 to provide air vents for air circulation for cooling purposes. Inside the container 12 is an upper and lower metal fin 20 and 22 shown in FIGS. 2 and 4. The oxygen producing device allows the outer container to be positioned on a patient's skin without burning the skin during burning of the candle 24 shown in FIG. 3.

The ignition device shown in FIGS. 2 and 3 generally referred to as numeral 14 is connected to an oxygen candle canister 16 by silicone sealing means at 26. The ignition device is supported by fin 20 to the outer container 12. The fin dissipates heat through openings 18 in the outer container 12. The upper fin and lower fin 22 are folded as shown and connected to the outer container. Fin 20 may be welded to the ignition device 14 and fin 22 may be welded to canister 16.

Referring now to FIG. 3, the ignition device includes the manifold 28, a glass capsule 30 filled with water 32, a capsule compartment 34 totally within the manifold 28, and an ignition mechanism generally referred to by numeral 36. The ignition mechanism 36 includes a plunger rod 38 movably positioned within the manifold for actuation by a user that presses knob 40 on the resilient cap 42. The upper end or proximal end of the rod 38 is connected to the cap 42, a semi-rigid plastic material. The bulbous-like cap or upper portion 49 has a knob or button 40 molded into the cap. When the rod 38 is moved downward, the washer 44 contacts the top 46 of the capsule compartment 34 and the distal end 48 of the rod 38 contacts the glass capsule 30 destroying same. The water 32 in the capsule moves onto the seal or metal membrane 50 that covers and seals opening 52 of the canister 16 and the water moves onto the distal end of rod 38.

The oxygen candles 24 may include alkaline metal, alkaline earth metal iodide or oxyiodide in combination with a principle oxidizer. The principal oxidizer consists of an alkaline metal mono-oxide and usually, an auxiliary oxidizer. The auxiliary oxidizer consists of one or more alkaline metal and alkaline earth metal peroxides and chlorates which term includes the chlorates and perchlorates. This composition is included as a top layer in compressing a chemical oxygen generator composition to be ignited by an ignition cone means. The water igniter causes initiation of the ignition cone composition. This is best performed through the use of an uncompacted or loose powder first fire composition of similar content as said ignition cone composition. The metal membrane or seal 50 is broken by rod 38 to open the exit 52 in the canister 16. The distal end of the rod 48 moves on a downward stroke into contact with the membrane and then pierces the membrane to move water from the collapsed glass capsule 30 into the candle material for ignition purposes. The candle 24 is ignited by water contacting the various ignitable substances in the top of the candle, such as chemical oxygen generator compositions.

The canister 16 is sealed from the atmosphere. The manifold is sealed against the escape of oxygen passing from opening 52 through member 34, the interior of the manifold 28 out through exit 60.

In use, the container is normally positioned during burn with its longitudinal axis in a generally horizontal position. Air will flow through holes or opening 18 in one side of the container 12 and out through the opposite side. Adjacent side openings will aid cooling. The container is shaped for stability in any position. Cooling will be effective in the position shown in FIG. 1.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. In an oxygen producing device including a canister with an exit opening and a sealing means covering said exit opening, an oxygen candle generating means in said canister, and an ignition device, the improvement comprising;

said ignition device connected to and sealed to said canister above said opening in said canister for igniting said oxygen candle generating means in the canister, said ignition device includes a manifold with an inlet and outlet, a capsule filled with ignition material connected to and positioned within said manifold, and an ignition mechanism connected within said manifold, said ignition mechanism including a plunger rod arranged and movably connected to said manifold for opening said capsule and said sealing means, said inlet, said capsule and said rod positioned over said exit opening, said rod having a distal end positoned in said manifold and arranged for movement throughout said ignition material and said sealing means to transfer said ignition material through said exit opening into contact with said candle to ignite said candle, said oxygen producing device includes an outer cover of non-metallic material, and fin means connected between said outer cover and said oxygen producing device, said outer cover having an outer surface, said outer cover and said fins arranged and designed to provide a cool outer surface during the burn cycle of said candle, said outer cover includes a plurality of openings and is spaced from said canister for the circulation of air for cooling purposes.

2. In an oxygen producing device including a canister with an exit, an oxygen candle generating means in said canister and an ignition device connected to said canister and arranged for igniting said oxygen candle generating means in the canister to produce oxygen, an improved insulation means comprising:

at least one fin connected to said canister, a non-metallic cover having sides connected to said fin and spaced from said canister, said cover surrounding said canister, said cover having a plurality of spaced openings on each side of said cover, said cover and said fins arranged to provide movement of air to cool said fins.

3. An improved insulation means as set forth in claim 2 wherein:

said cover having an outer surface cooled by the movement of air to provide a cover that may be handled during the burn cycle of the oxygen generating means.

* * * * *